Nov. 10, 1953  J. M. FORMWALT  2,658,819
APPARATUS FOR MEASURING CHEMICAL
ACTIVITY, PARTICULARLY
OF CATALYSTS
Filed Aug. 23, 1949
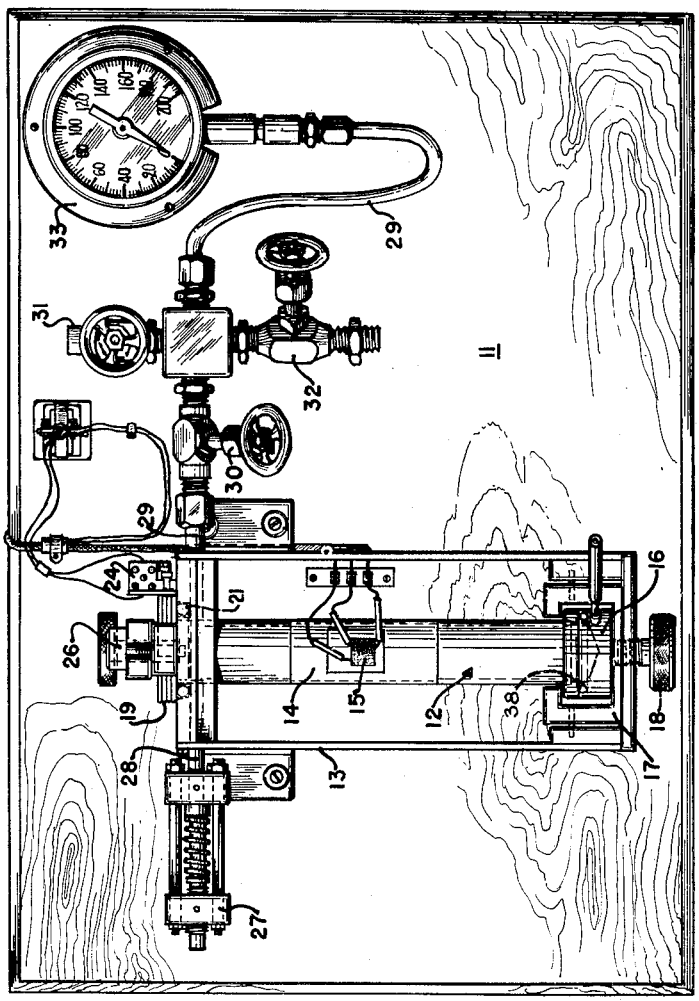
FIG.1.
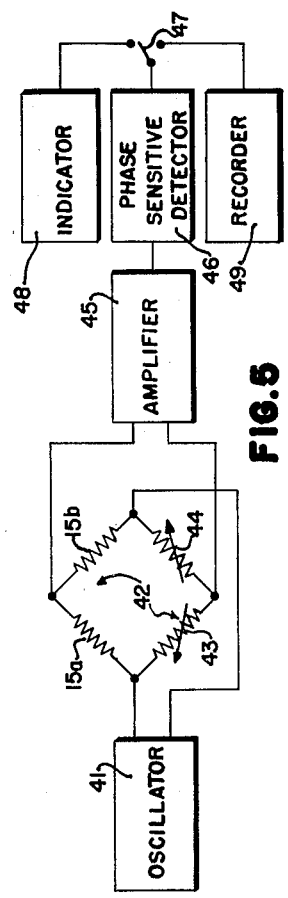
FIG.5
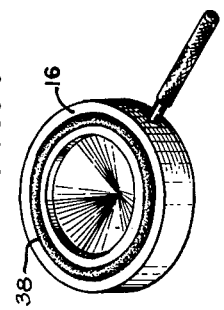
FIG.4
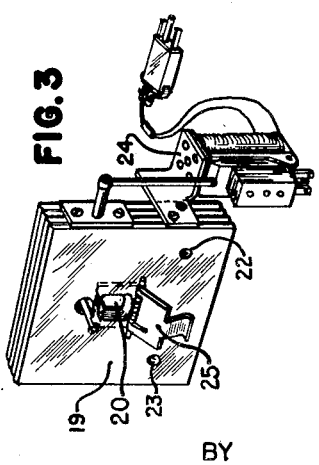
FIG.2
FIG.3
INVENTOR
JOHN M. FORMWALT
BY M.C.Hayes
ATTORNEY Patented Nov. 10, 1953

2,658,819

UNITED STATES PATENT OFFICE 2,658,819

APPARATUS FOR MEASURING CHEMICAL ACTIVITY, PARTICULARLY OF CATALYSTS

John M. Formwalt, Newport, R. I.

Application August 23, 1949, Serial No. 111,959

7 Claims. (Cl. 23—253)

(Granted under Title 35, U. S. Code (1952), sec. 266)

This invention relates, in general, to apparatus for measuring chemical activity and, more particularly, to apparatus for measuring the activity of catalysts.

It is frequently necessary in the chemical art to determine the activity of catalysts in their effect on a chemical reaction. In the case of the decomposition of hydrogen peroxide, for example, where it is desired to accurately determine the rate of oxygen evolution from such decomposition, solid catalysts are often used. Usually, a small, accurately measured quantity of catalytic material is dropped into a container of hydrogen peroxide and two measurements are made. First, the rate of change of pressure in the container is determined, and second, the time elapsing between the instant of dropping the catalyst and the beginning of the rise in pressure is measured. These two factors constitute an excellent basis for indicating catalyst activity.

Heretofore, devices used for such measurements involved the use of a glass reaction tube holding a sample of hydrogen peroxide, into which a small amount of the catalyst was dropped. The gas evolved was passed through glass and rubber tubing and collected by the displacement of water in an inverted glass graduate initially filled with water. When the first bubbles of gas appeared, a stop watch was started, and when the volume of gas collected in the graduate reached a predetermined quantity, the operator stopped the stop watch and removed the rubber stopper and glass tubing from the glass reaction tube to stop the flow of gas. The average rate of gas evolution was then computed by dividing the volume of gas collected by the time required to collect it.

This method was hazardous to the operator, as the catalyst sample was dropped manually, and a violent reaction sometimes blew the stopper or tubing from the reaction tube, or shattered the glass tube and scattered broken glass and hydrogen peroxide. Another objectionable feature of the old method was the inaccuracy of results obtained because of the manual operation of the stop watch. The rapidity of the chemical reactions was such that the time required for operation of the stop watch became a significant proportion of the complete time involved in the measurements.

Therefore, it is an object of this invention to provide a substantially explosion-proof device for the measurement of gas evolved in a chemical reaction.

A further object of the invention is to provide a device for continuously recording pressure changes within a reaction tube.

Another object of the invention is to provide a device for automatically determining pressure changes in a reaction tube with a fine degree of accuracy.

A still further object of the invention is to provide a permanent record of the activity of a catalyst in a chemical reaction.

In general, the present invention consists of a hollow, metallic cylinder forming a closed container into which the catalyst sample is dropped. The changing pressure within the cylinder is continuously recorded by means of temperature-compensated resistance wire strain gauges mounted on a thin section of the cylinder wall. A bridge circuit, energized by a suitable oscillator, incorporates the resistance wire gauges as two of its arms. The other two arms of the bridge are composed of variable resistors which have been previously adjusted for zero voltage across the bridge at base pressure in the container. The bridge unbalance voltage resulting from changing pressure is then amplified and a phase-sensitive demodulator detects the amplified voltage, providing an output current proportional to the unbalance voltage of the bridge, and, accordingly, proportional to the pressure within the cylinder. An oscillograph or other suitable indicator is then used to display the pressure changes as well as an indication of the instant of the dropping of the catalyst calibrated against an accurate time base. Other and further objects, features and advantages of the invention will become apparent from the following description when read in connection with the accompanying drawings wherein:

Fig. 1 is an assembly view of a preferred embodiment of the invention;

Fig. 2 is a perspective view of the top portion of the reaction tube of the embodiment shown in Fig. 1;

Fig. 3 is a perspective view of the catalyst container of the apparatus of Fig. 1;

Fig. 4 is a perspective view of the chemical container used in the embodiment of Fig. 1; and Fig. 5 is a block diagram of the electronic circuit used with the apparatus of Fig. 1 to indicate or record data.

The embodiment of the invention shown in Fig. 1 includes a mounting board 11, to which a hollow, metallic cylinder 12 is attached by means of a suitable frame 13. Cylinder 12 has a thin section 14 upon which is mounted a strain gauge rosette 15 having resistance wires 15a along the axis and 15b along the periphery of cylinder 12. A cup 16 is clamped in place at the bottom of hollow cylinder 12 by means of a clamp 17 and a clamping assembly 18. A plate 19, removably secured at the top of the cylinder, has a catalyst compartment 20 formed therein which opens into cylinder 12. A solenoid 24 is mounted on plate 19 for releasing a spring-loaded barrier 25 between compartment 20 and hollow cylinder 12. A clamping assembly 26 holds plate 19 firmly in contact with the top of tube 12. A safety valve 27 communicates with the interior of the cylinder 12 by means of a pipe 28. A second pipe 29 connects the interior of the cylinder 12 with the shut-off valve 30, inlet valve 31, bleeder valve 32, and pressure gauge 33, the purpose of which will later be described.

Fig. 2 illustrates in detail clamping device 26, communicating pipes 28 and 29, sealing gasket 21, and placement studs 35 and 36, which are adapted to be engaged in receptacles 22 and 23 of the plate 19, a phantom view of which is also illustrated.

Fig. 3 shows in detail plate 19, including solenoid 24, spring-loaded barrier 25, catalyst compartment 20, and the stud receptacles 22 and 23.

Fig. 4 shows the chemical containing cup 16 with its associated gasket 38.

Fig. 5 is a block diagram of an indicating and recording circuit which includes an oscillator 41 adapted to supply a small alternating voltage to a bridge 42 having adjustable resistors 43 and 44. The resistors 15a and 15b are the component resistance wires of strain gauge 15, heretofore referred to. The bridge 42 is adjusted for zero current when resistors 15a and 15b are subjected to no strain. The amplifier 45 is connected for amplifying the output from the bridge 42 when pressures cause the resistors 15a and 15b to change in value. A phase-sensitive detector 46 is connected for detecting the output of the amplifier 45. A switch 47 is then used to connect the detector output to either an indicator 48 or a recorder 49, as desired.

The apparatus of the invention having been described, the operation is as follows: The safety valve 27 is set by introducing a fluid under pressure to the system through inlet valve 31 until the pressure is at a desired level as measured by pressure gauge 33. The safety valve 27 is then adjusted to release at this desired pressure level. The pressure is then released through bleeder valve 32. At this point, with atmospheric pressure in cylinder 12, bridge 42 is balanced for zero output by means of adjustable resistors 43 and 44. Any change in resistors 15a and 15b of strain gauge 15 will then result in unbalancing bridge 42. To calibrate the apparatus, bleeder valve 32 is then closed and fluid under pressure is introduced through inlet valve 31. This pressure will produce a small deformation of the tube 12 with a resulting change of resistance of the strain gauge elements, and, accordingly, an unbalance of the bridge. The pressure is read on the gauge 33 and a reading taken on the indicator 48 or recorder 49. This process is repeated until a complete calibration curve of pressure against indicator voltage is obtained for a desired range of pressures.

A catalyst sample is now prepared, weighed, and placed in the compartment 20 of plate 19 and the barrier 25 is closed. Plate 19 is then clamped in place on top of cylinder 12 and the clamping assembly 26 is tightened. Shut-off valve 30 is tightly closed to isolate the cylinder 12 from the auxiliary equipment along pipe line 29. A measured quantity of hydrogen peroxide is placed in the cup 16, and cup 16 is clamped in place at the bottom of cylinder 12 by means of the clamping assembly 18. The recorder 49 is then started and a switch (not shown) is closed to energize the solenoid 24 and simultaneously to apply a voltage pulse to recorder 49. The solenoid releases the spring barrier 25 and the catalyst sample falls into the hydrogen peroxide in cup 16. The record from recorder 49 will then show an indication of the voltage pulse at the time of the dropping of the catalyst. As gas is evolved from the chemical in cup 16, changing pressures within cylinder 12 will cause strains that are about twice as great in the circumferential direction as in the longitudinal direction. Temperature changes will cause equal strains in the circumferential and longitudinal directions. Hence, by reason of the bridge connections used, the indications obtained are temperature compensated, and the record obtained from recorder 49 will comprise a curve which is a graph of pressure as a function of time, the pressure scale being determinable from the calibration curve previously made. The maximum slope of the recorded curve is one measure of the activity of the catalyst; another is the delay in starting, which is the period of time from the mark indicating the instant of release of the catalyst to the first discernible increase in pressure less the constant time of fall of the catalyst.

The entire operation of dropping the catalyst may be carried out with cylinder 12 immersed in a controlled temperature bath. Such immersion should preferably precede the actual measurement by a period of time sufficient to assure the establishment of thermal equilibrium before proceeding with the test.

While what has been described is at present considered the preferred embodiment of the invention, it will be apparent to those skilled in the art that various modifications and changes may be made therein without departing from the spirit and scope of the appended claims.

The invention described herein may be manufactured and used by or for the Government of the United States of America for Government purposes without the payment of royalty thereon or therefor.

What is claimed is:

1. Apparatus for measuring the activity of a catalyst used to evolve gas from a chemical substance comprising, a cylindrical reaction chamber for containing said chemical substance having a thin wall and a length long in comparison to its diameter, a temperature compensated strain gauge mounted on said wall having two resistance wire elements at right angles to each other for measuring circumferential and longitudinal strains in said wall, means for introducing said catalyst into said chamber, a bridge circuit incorporating said two resistance wire elements as two of its arms, and means for indicating resistance unbalance in said bridge circuit after the introduction of said catalyst.

2. Apparatus for measuring the activity of a catalyst used to evolve gas from a chemical substance comprising, a cylindrical reaction chamber for enclosing said chemical substance having a thin wall and a length long in comparison to its diameter, means for introducing said catalyst into said reaction chamber, a temperature compensated strain gauge mounted on said thin wall for measuring circumferential and longitudinal strains in said wall, and means for continuously recording the difference between said circumferential and longitudinal strains from the instant of the introduction of said catalyst into said reaction chamber.

3. Apparatus for measuring the activity of a catalyst used to evolve gas from a chemical substance comprising, a hollow open-ended cylindrical reaction chamber having a thin wall, a cup for holding said chemical substance, means for clamping said cup in pressure-tight relationship to one end of said reaction chamber, the interior of said cup communicating with the interior of said reaction chamber, a plate having a cavity formed therein for holding said catalyst, means for clamping said plate in pressure-tight relationship with the other end of said reaction chamber with said cavity communicating with the interior of said reaction chamber, means for releasing said catalyst into said reaction chamber, means for continuously measuring circumferential and longitudinal strains in said thin wall of said reaction chamber, and means for continuously recording the difference between said circumferential and longitudinal strains from the instant of releasing said catalyst.

4. Apparatus for measuring the activity of a catalyst used to evolve gas from a chemical substance comprising, a hollow open ended cylindrical reaction chamber having a thin wall, a cup for holding said chemical substance, means for clamping said cup in pressure-tight relationship to one end of said reaction chamber, the interior of said cup communicating with the interior of said reaction chamber, a plate having a cavity formed therein for holding said catalyst, means for clamping said plate in pressure-tight relationship with the other end of said reaction chamber such that said cavity communicates with the interior of said reaction chamber, means for introducing said catalyst from said cavity into said reaction chamber, and means for continuously measuring and recording the pressure within said reaction chamber from the instant of introduction of said catalyst.

5. Apparatus for measuring the activity of a catalyst used to evolve gas from a chemical substance comprising, a hollow open ended cylindrical reaction chamber mounted in a substantially vertical position, a cup for holding said chemical substance, means for clamping said cup in pressure-tight communicating relationship to the bottom of said reaction chamber, a cap member having a cavity formed therein for holding said catalyst, a hinged plate adjacent to and normally closing the mouth of said cavity, a spring operative upon said plate to urge said plate away from said member, a latch for holding said plate against said member to maintain said cavity closed, means external to said reaction chamber for releasing said latch, means for clamping said cap member to the top of said reaction chamber such that said hinged plate upon movement away from said cap member permits communication between said cavity and said reaction chamber, and release of said catalyst into said reaction chamber, a strain gauge attached to the exterior wall of said reaction chamber and indicating means coupled to said strain gauge for indicating strains registered by said gauge.

6. Apparatus for measuring the activity of a catalyst used to evolve gas from a chemical substance comprising, a hollow open ended cylindrical reaction chamber mounted in a substantially vertical position, a cup for holding said chemical substance, means for clamping said cup in pressure-tight communicating relationship to the bottom of said reaction chamber, a cap member having a cavity formed therein for holding said catalyst, a hinged plate adjacent to and normally closing the mouth of said cavity, a spring operative upon said plate to urge said plate away from said member, a latch for holding said plate against said member to maintain said cavity closed, a solenoid for releasing said latch upon energization thereof, means for clamping said cap member to the top of said reaction chamber such that said hinged plate upon movement away from said cap member permits communication between said cavity and said reaction chamber and release of said catalyst into said reaction chamber, a first resistance wire strain gauge attached to and disposed longitudinally of the exterior wall of said reaction chamber, a second resistance wire strain gauge attached to and disposed circumferentially of the exterior wall of said reaction chamber, a bridge circuit incorporating the resistance wire of said first strain gauge as one of its arms and the resistance wire of said second strain gauge as another of its arms adjacent said one of its arms, potentiometers forming the other two arms of said bridge circuit, an oscillator for supplying an alternating voltage to said bridge circuit, means for amplifying the output of said bridge circuit, a phase sensitive detector for detecting the output of said amplifier, and a recording device for continuously indicating the output of said phase sensitive detector, said recording device and said solenoid being simultaneously energized to provide an indication on said recording device of the instant of opening of said cavity.

7. Apparatus for measuring the evolution of gas from the reaction of a chemical substance comprising, a cylindrical constant-volume pressure-tight reaction chamber, said chamber being long in comparison to its diameter, means for introducing said chemical substance into said chamber, means for measuring the longitudinal strain in the wall of said reaction chamber caused by pressure of said gas, means for measuring the circumferential strain in the wall of said reaction chamber caused by pressure of said gas, means for continuously recording the difference between said circumferential and said longitudinal strains, and means for simultaneously actuating said means for introducing said chemical substance and said recording means, whereby said recording means provides a continuous record of the difference between said circumferential and said longitudinal strains for a period beginning at the instant of introduction of said chemical substance.

JOHN M. FORMWALT.

References Cited in the file of this patent
UNITED STATES PATENTS

| Number | Name | Date |
|---|---|---|
| 1,976,752 | Stanworth | Oct. 16, 1934 |
| 2,062,609 | Reid | Dec. 1, 1936 |
| 2,365,015 | Simmons, Jr. | Dec. 12, 1944 |
| 2,420,148 | Ostergren | May 6, 1947 |
| 2,475,387 | Golden | July 5, 1949 |
| 2,500,964 | Sullivan et al. | Mar. 21, 1950 |
| 2,509,621 | Willoughby | May 30, 1950 |

OTHER REFERENCES

Bellinger et al.: "Ind. and Eng. Chemistry"; vol. 38, No. 2, pages 160–169, February 1946.